United States Patent [19]

Suzuki et al.

[11] Patent Number: 5,344,260
[45] Date of Patent: Sep. 6, 1994

[54] MAIN SPINDLE APPARATUS OF MACHINE TOOL

[75] Inventors: Shigeru Suzuki, Kawasaki; Motonori Kobara; Yasuhiro Hisatomi, both of Futtu; Yoshinori Yamaguchi, Yamatokoriyama; Hiroshi Yonetani, Yamatokoriyama; Kiyoyuki Fukushima, Yamatokoriyama; Yoshimasa Sakamoto, Yamatokoriyama; Toru Yagami, Yamatokoriyama; Toshihide Kamei, Yamatokoriyama, all of Japan

[73] Assignees: Kuroda Seiko Co., Ltd., Kawasaki; Mori Seiki Co., Ltd., Yamatokoriyama, both of Japan

[21] Appl. No.: 37,378

[22] Filed: Mar. 26, 1993

[30] Foreign Application Priority Data

Apr. 2, 1992 [JP] Japan .................................. 4-109243

[51] Int. Cl.$^5$ ............................................. B23B 41/00
[52] U.S. Cl. ....................................... 408/168; 82/1.2; 408/161
[58] Field of Search ............... 408/158, 161, 168, 169, 408/147, 186; 82/1.2, 1.4

[56] References Cited

U.S. PATENT DOCUMENTS 4,611,958  9/1986  Vasilchenko .......................... 408/168

FOREIGN PATENT DOCUMENTS 115110   7/1984   Japan .................................. 408/147
61-28643  8/1986  Japan .
61-40410 11/1986  Japan .
62-161904 10/1987 Japan .

Primary Examiner—Steven C. Bishop
Attorney, Agent, or Firm—Varndell Legal Group

[57] ABSTRACT

A tool holder is detachably secured to the lower end of a main spindle by means of a clamping nut having a female screw cooperating with a male screw of the main spindle such that keys are inserted into corresponding key recesses formed in an upper end face of the tool holder. Within the main spindle, there is arranged a driving shaft movably in an axial direction. Within the tool holder, a piston member is arranged movably in the axial direction. To a lower end of the driving shaft is provided a projection having a circular recess formed in an outer surface thereof. To an upper end portion of the piston member are secured a plurality of steel balls movably in a radial direction. A lower end of the piston member is formed as an inclined surface which is engaged with a cam surface of a tool fitting plate arranged movably in the radial direction. When the driving shaft is moved downward, the balls are inserted into the circular recess formed in the projection of the driving shaft so that the driving shaft is coupled with the piston member. Therefore, by moving the driving shaft up and down, the piston member is also moved up and down and this movement of the piston member is converted into the radial movement of the tool fitting plate. By moving the driving shaft upward, the tool holder may be exchanged automatically.

7 Claims, 8 Drawing Sheets

MAIN SPINDLE APPARATUS OF MACHINE TOOL

BACKGROUND OF THE INVENTION

1. Field of the Invention

The present invention relates to a main spindle apparatus of a machine tool for detachably coupling a tool holder for supporting a tool with the main spindle in such a manner that a position of the tool in a radial direction perpendicular to an axial direction of the main spindle can be controlled during the rotation of the main spindle.

2. Description of the Related Arts

Heretofore, in case of forming a tapered bore in a work piece, a tool such as a cutter coupled with a main spindle is moved in a radial direction perpendicular to an axial direction of the main spindle. Further, in order to change the tool, the tool is detachably coupled with the main spindle. Therefore, the machine tool has to be provided with a main spindle apparatus for detachably coupling the main spindle with the tool such that the tool can be moved in the radial direction.

For instance, in Japanese Utility Model Publication No. 62-161904, there is described a first known main spindle apparatus. In this main spindle apparatus, a clamp rod is biased by a belleville spring in a backward direction and a neck portion of a pull stud secured to a tool holder of taper shank type is held by a clamp ball such that the tool holder is prevented from being removed from a taper socket of the main spindle, wherein the control of the radial position of the cutter is carried out by slidably inserting a recess rod and a reciprocally moving rod into the clamp rod and pull stud.

In Japanese Utility Model Publication No. 61-40410, there is disclosed a second known main spindle apparatus having a similar construction as that of the first known main spindle apparatus, in which there is provided a means for engaging a correcting bar with a connecting rod.

Furthermore, in Japanese Utility Model Publication No. 61-28643, there is described a third known main spindle apparatus, in which a slider is held by a supporting block which is secured to a lower end of the main spindle by means of bolts and the radial position of the cutter is controlled by moving an operation rod in the axial direction.

In the first known main spindle apparatus, there are following problems.

(a) A mechanism for pulling the tool into the main spindle has to be provided, so that the construction becomes very complicated.

(b) The tool is held only by a tapered portion, and thus mechanical strength of holding the tool is weak.

(c) During the high speed rotation, the main spindle is liable to be unbalanced due to the deformation of the belleville spring, so that the precision of machining is reduced.

(d) The recess rod and reciprocally moved rod are merely brought into contact with each other, but are not coupled with each other, and thus the outward radial movement of the tool is effected by the forward movement of the recess rod and the inward radial movement of the tool is performed by a driving force of a spring provided in the reciprocally moved rod. Therefore, in order that the reciprocally moved rod follows the movement of the recess rod against the sliding resistances of the tool holder and gear portions, there is required a very large spring force, so that a necessary force for driving the recess rod becomes also very large.

(e) When the tool is secured such that its cutting edge is faced toward the axis center of the main spindle and the outer radial boring is carried out, if there is applied an outward radial force that is larger than the spring force, the tool is moved away from the axial center and the machining is no more possible.

In the second known main spindle apparatus, the radial movement of the cutting tool is controlled by engaging the correcting bar with the connecting rod, and thus the above mentioned problems (d) and (e) can be solved. However, when the engaging member is provided in the standardized conventional pull stud, the engaging member has to be very small, so that its mechanical strength becomes very small. If a diameter of the pull stud is increased in order to install a large engaging member therein, diameters of the belleville spring, main spindle and bearings have to be correspondingly large, and therefore the main spindle apparatus is not suitable for a high speed rotation. Moreover, it is necessary to provide a special cylinder for rotating the engaging member over 90 degrees. This results in the increase in the number of parts and the cost is liable to be high.

In the third known main spindle apparatus, the construction is rather simple, because only the operation rod is provided within the main spindle. However, the supporting block is secured to the main spindle by the bolts, and thus the tool could not be exchanged automatically. In a machining center, the tool has to be exchanged often, so that it is desired to utilize an automatic tool exchanger.

SUMMARY OF THE INVENTION

The object of the present invention is to provide a novel and useful main spindle apparatus of a machine tool, in which the tool is detachably coupled with the main spindle such that the tool can be exchanged by the automatic tool exchanger and the radial position of the tool can be controlled precisely and positively, while the high mechanical strength of the main spindle apparatus can be attained.

According to the invention, a main spindle apparatus of a machine tool comprises:

a main spindle having a male screw formed in an outer surface of one end portion of the main spindle;

a clamping nut having a female screw which is engaged with said male screw of the main spindle and a plurality of clamping claws;

a tool holder for supporting a tool movably in a radial direction perpendicular to an axial direction of the main spindle, and having a portion which is engaged with said clamping claws of the clamping nut;

a first driving member arranged movably in the axial direction within said main spindle and having first and second end portions, said first end portion being connectable to a driving source for moving the first driving member in the axial direction;

a second driving member arranged movably in the axial direction within said tool holder and having first and second end portions;

a coupling means for detachably coupling said second end portion of said first driving member with said first end portion of the second driving member by moving said first driving member in the axial direction; and a converting means arranged in said tool holder for converting a movement of the second driving member in the axial direction into a movement of the tool in the radial direction.

According to the invention, the first driving member in the main spindle apparatus can be coupled with and decoupled from the second driving member by moving the first driving member in the axial direction, and after the first and second driving members have been coupled with each other, a position of the tool in the radial direction can be controlled precisely by moving the first and second driving members in the axial direction. That is to say, the first driving member has two functions, i.e. a function for detachably coupling the main spindle with the tool and a function for moving the tool in the radial direction. Therefore, the main spindle can be constructed simply and the diameter of the main spindle can be diminished, and thus the main spindle can be rotated at a high speed. Further, the tool holder can be exchanged by the automatic tool exchanger.

DESCRIPTION OF THE PREFERRED EMBODIMENTS

Figure 1:
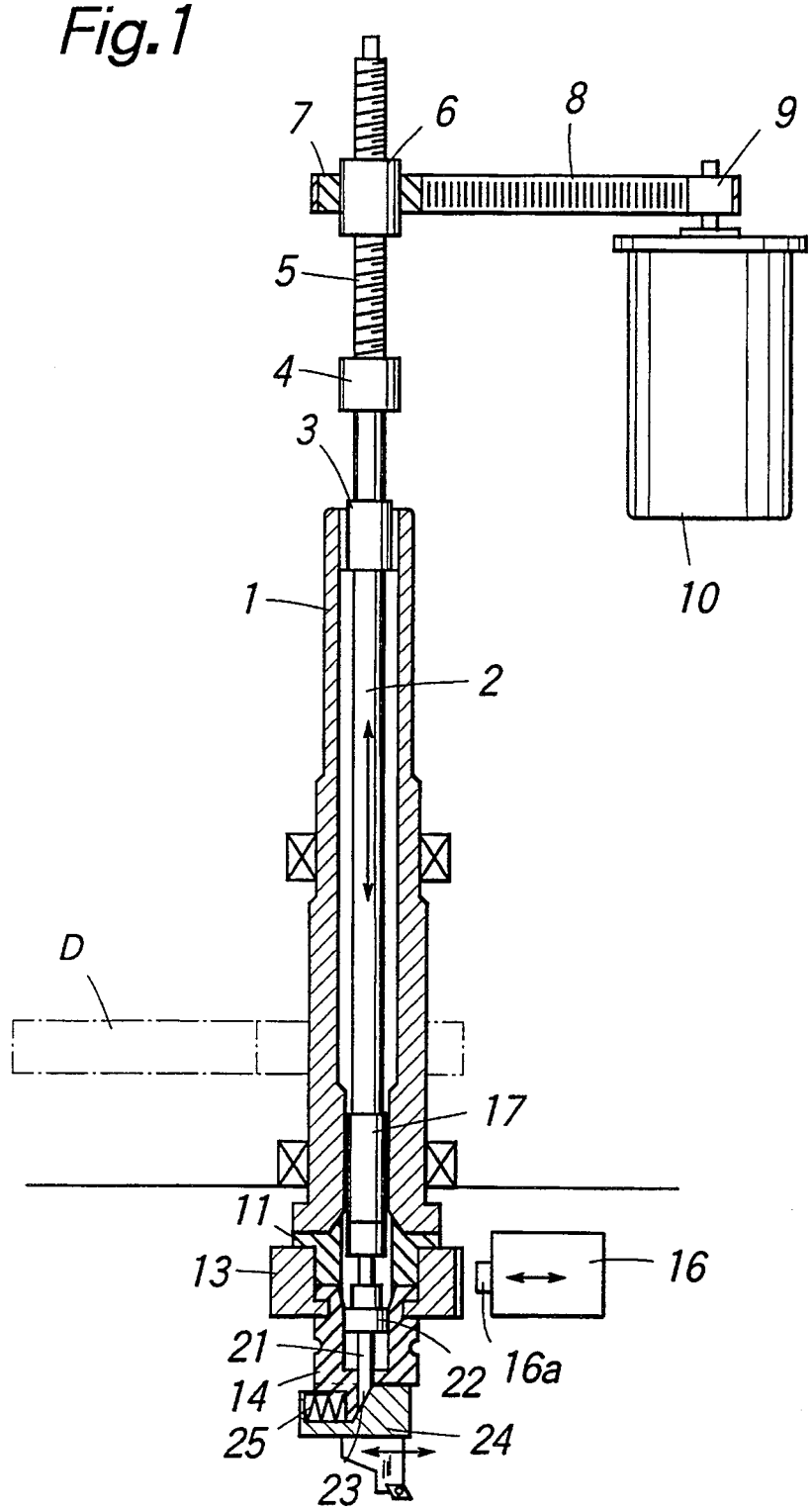
FIG. 1 is a longitudinal cross sectional view showing a whole construction of an embodiment of the main spindle apparatus according to the invention.

FIG. 1 is a longitudinal cross sectional view illustrating a whole construction of an embodiment of the main spindle apparatus of a machine tool according to the invention. A main spindle 1 is formed by a hollow shaft and a driving shaft 2 serving as the first driving member is arranged within the main spindle 1 coaxially. The driving shaft 2 is spline-coupled with a nut 3 which is secured to a main spindle head not shown. Therefore, the driving shaft 2 is not rotated together with the main spindle 1, but is movable in an axial direction. An upper end of the driving shaft 2 having the spline formed therein is coupled with a thread mandrel 5 by means of a coupling 4, and the thread mandrel 5 is coupled with a thread nut 6 by means of a ball thread mechanism. The thread nut 6 is rotatably coupled with the main shaft head. To an outer surface of the thread nut 6 is secured to a pulley 7 which is coupled with via timing belt 8 and pulley 9 with an output shaft of a servo motor 10. When the servo motor 10 is rotated, the rotation is transmitted via the pulley 9, timing belt 8 and pulley 7 to the thread nut 6 and thus the thread mandrel 5 is moved up and down in the axial direction. This movement of the thread mandrel 5 can be performed completely independently from the rotation of the main spindle 1 by a main spindle driving means D which is shown only schematically in FIG. 1.

Figure 2:
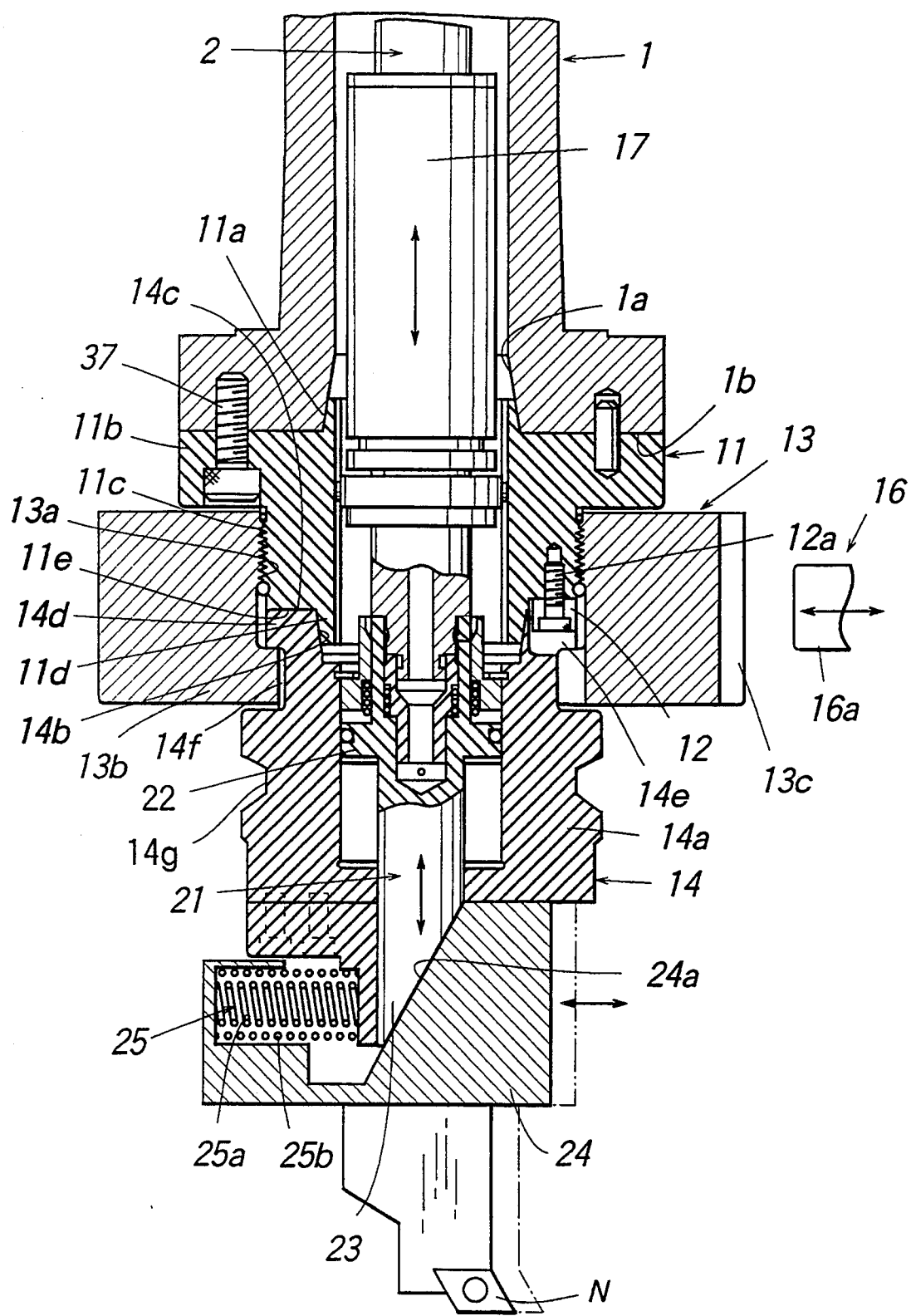
FIG. 2 is an enlarged cross sectional view illustrating a major portion of the main spindle apparatus shown in FIG. 1.

FIG. 2 is an enlarged cross sectional view showing a detailed construction of a lower portion of the main spindle apparatus shown in FIG. 1. In a lower portion of the main spindle 1, there are formed a tapered opening 1a and a contact end face 1b which extends perpendicularly to the axis direction of the main spindle. To the lower end of the main spindle 1, is secured an interconnecting member 11 by means of bolts 37. That is to say, a tapered upper end 11a of the interconnecting member 11 is inserted into the tapered opening 1a of the main spindle 1 and an upper surface of a flange portion 11b of the interconnecting member 11 is brought into contact with the contact end face 1b of the main spindle 1. In an outer surface of the flange portion 11b, there is formed a male screw 11c. In a lower end portion of the interconnecting member 11, there is formed a tapered portion 11d whose diameter is decreased toward the lower end thereof. Further in the lower portion of the interconnecting member 11, there is formed a contact end face 11e. In this contact end face 11e, there are provided equiangularly a plurality of keys 12 for transmitting the driving force from the main spindle 1 to a tool holder 14 as will be explained later. In the present embodiment, there are provided three keys 12 which are angularly separated from each other by 120 degrees.

To the male screw 11c of the interconnecting member 11 is screwed a clamping nut 13 for detachably securing a tool holder 14 to the main spindle 1. The tool holder 14 may have different constructions depending upon tools to be used. In the present embodiment, the tool holder 14 is formed as a bite holder. In an upper portion of a main body 14a of the tool holder 14 there are formed a tapered opening 14b into which the tapered portion 11d of the interconnecting member 11 is inserted and a flange portion 14d having a contact end face 14c which is brought into contact with the contact end face 11e of the interconnecting member 11.

In the flange portion 14d, there are formed a plurality of key recesses 14e into each of which respective keys 12 are inserted. The key recesses 14d are communicated with a circular recess 14f, and below the circular recesses there is formed a V-shaped circular recess 14g which is grasped by a manipulator of a device for automatically exchanging the tool holder 14.

Figure 3:
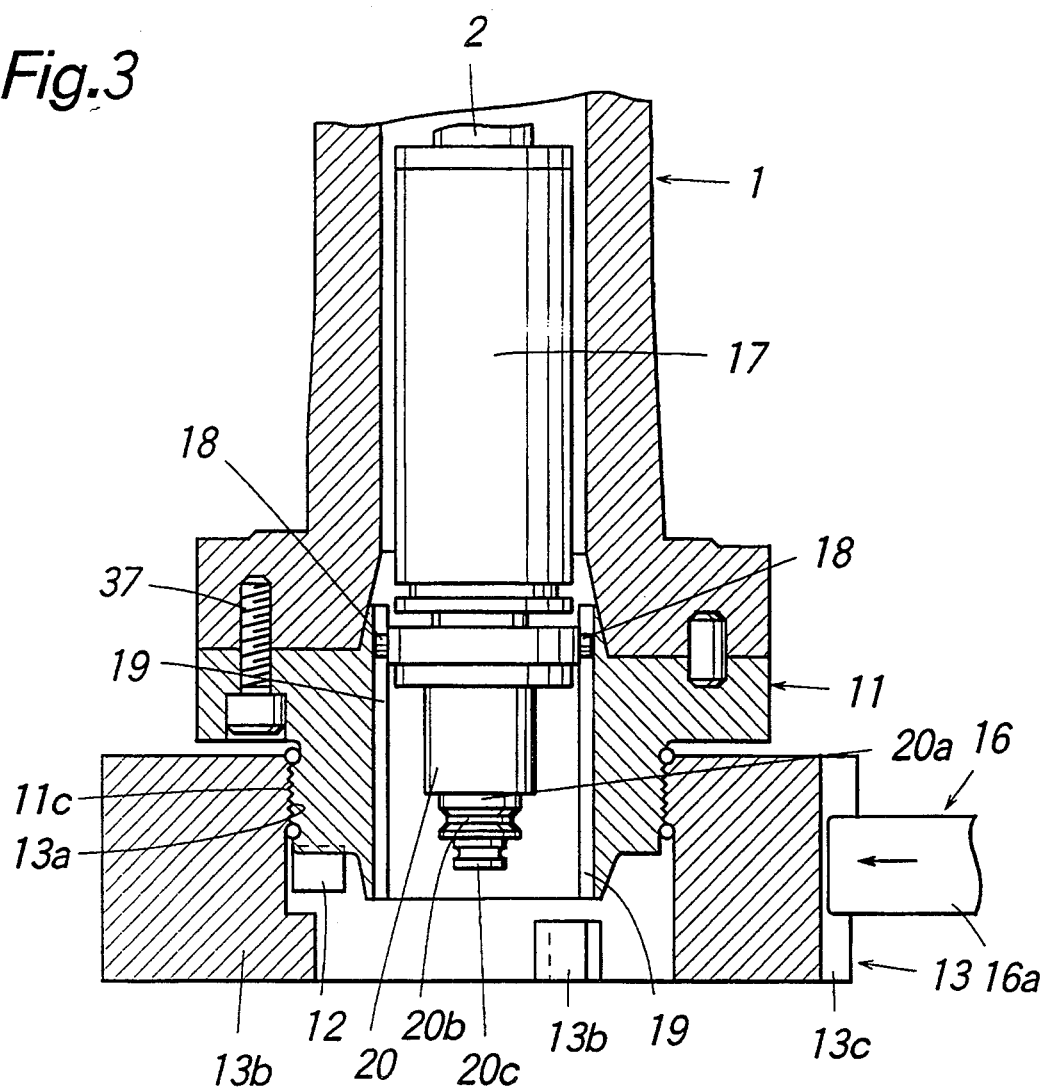
FIG. 3 is a longitudinal cross sectional view depicting a lower portion of the main spindle apparatus to which the tool holder is not coupled.
Figure 4:
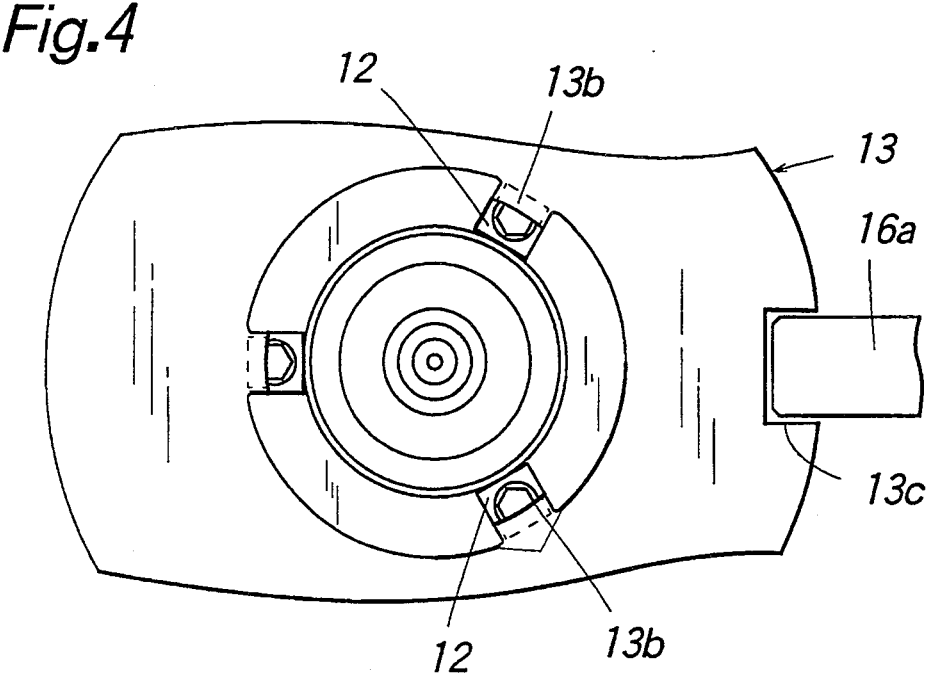
FIG. 4 is a bottom view of the main spindle apparatus shown in FIG. 3.

FIG. 3 is a longitudinal cross sectional view showing the construction of the main spindle 1 to which the tool holder is not secured, and FIG. 4 is a bottom view thereof. The clamping nut 13 has formed at its upper portion a female screw portion 13a which is screwed with the male screw portion 11c of the interconnecting member 11. In the lower end of the clamping nut 13 there are formed a plurality of clamping claws 13b which extend inwardly at angular positions corresponding to the driving force transmitting keys 12. Further, in an outer surface of the clamping nut 13, there are formed any desired number of locking depressions 13c in the form of recesses or holes. In the present embodiment, the locking depressions 13c are formed as recesses. Into the locking recesses 13c is inserted a rod 16a of a locking mechanism 16 secured to a stationary portion of the machine tool so that the rotation of the clamping nut 13 can be selectively prevented. The locking mechanism 16 may be formed by, for instance a fluid cylinder and the rod 16a may be formed by a plunger. It should be noted that the locking mechanism 16 may be constructed in any other form.

As illustrated in FIG. 3, to the lower end of the driving shaft 2 is secured a coupling 17, a lower end of the coupling is coupled with a disc member 17a by means of a bearing, and a plurality of pins 18 are secured to an outer surface of the disc member 17a equiangularly. These pins 18 are inserted into guide recesses 19 formed in an inner wall of a central hole of the interconnecting member 11, so that the disc 17a and interconnecting member 11 are rotated together with each other, but the driving shaft 2 is not rotated. To the lower end of the disc member 17a is secured a shaft 20 having a projection 20a whose diameter is slightly smaller than that of the shaft 20. In an outer surface of the projection 20a there is formed a circular recess 20b. The projection 20a further comprises a front chip 20c which can be clamped into a retainer 27 of the tool holder 14 as will be explained later. It should be noted that the shaft 20 and projection 20a as well as the pins 18 are rotatable with respect to the coupling 17.

Figure 5:
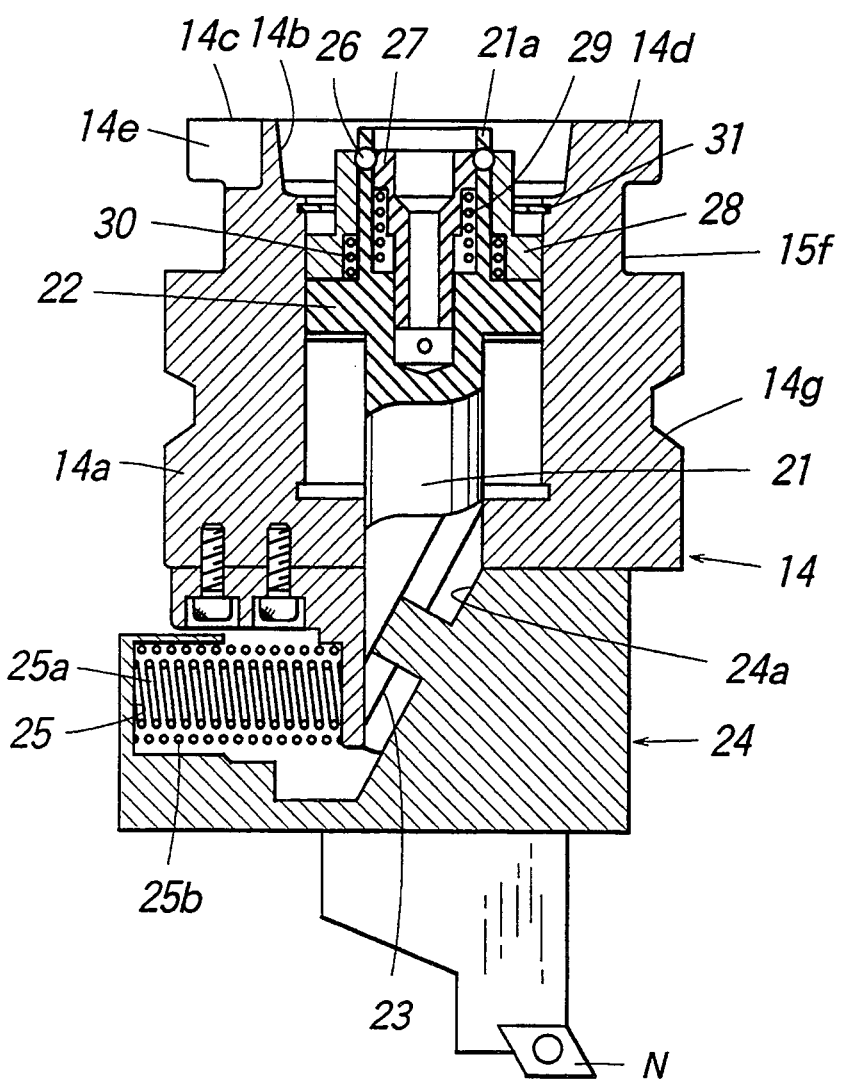
FIG. 5 a longitudinal cross sectional view showing the detailed construction of the tool holder.
Figure 6:
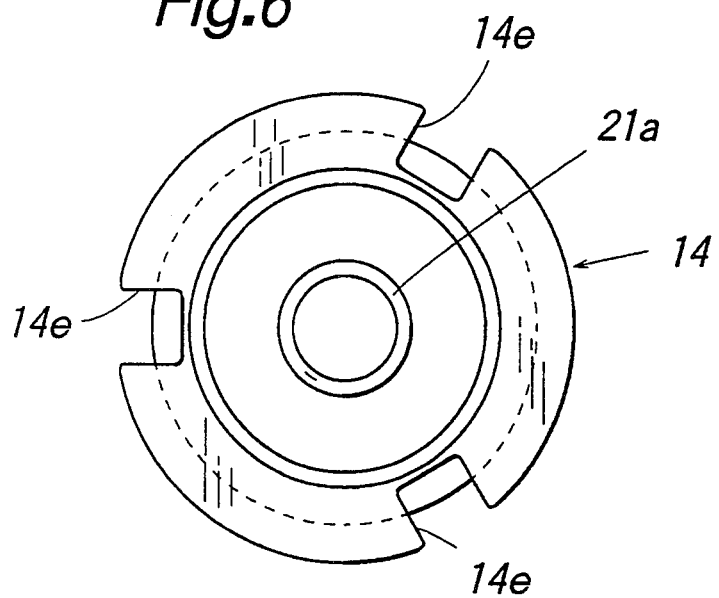
FIG. 6 is a plan view of the tool holder.

FIG. 5 is a cross sectional view of the tool holder 14 which is not secured to the main spindle 1, and FIG. 6 is a plan view of the tool holder 14. As shown in FIG. 5, within a main body 14a of the tool holder 14 there is provided a piston member 21 which is movable in the axial direction. This piston member 21 forms a second driving member. At an upper portion of the piston member 21 there is formed a connecting portion 22 by means of which the piston member is coupled with the lower end of the driving shaft 2. A lower end of the piston member 21 is cut in an inclined manner to form a inclined cam surface 23. To a lower surface of the main body 14a of the tool holder 14 is secured a tool fitting plate 24 in such a manner that the tool fitting plate is movable in the radial direction. The tool fitting plate 24 has formed therein an inclined surface 24a which is brought into contact with the cam surface 23 of the piston member 21. It should be noted that the tool fitting plate 24 is engaged with a T groove which is formed in the inclined cam surface 23 and extends in parallel with the inclined surface 24a, so that when the piston member 21 is moved up and down, the tool fitting plate 24 is moved leftward and rightward. In FIG. 5, a reference numeral N denotes a cutter secured to the tool fitting plate 24.

Between the main body 14a of the tool holder 14 and the tool fitting plate 24, there is provided a spring 25 consisting of two coiled springs 25a and 25b. The spring 25 serves to bias the tool fitting plate 24 against the cam surface 23 of the piston member 21. Therefore, when the piston member 21 is moved downward, the tool fitting plate 24 is moved rightward against the force of the spring 25 and thus the cutter N is moved in the radial direction. When the piston member 21 is moved upward, the tool fitting plate 24 is moved leftward into a zero point. In the zero point, the tool may be exchanged.

As illustrated in FIG. 5, in an upper end of the piston member 21 there is formed a cylindrical portion 21a, and in the cylindrical portion there are formed a plurality of holes equiangularly and steel balls 26 are inserted into respective holes. A retainer 27 is clamped into the cylindrical portion 21a and the cylindrical portion is clamped into a sleeve 28. The retainer 27 and sleeve 28 are biased upwardly by means of springs 29 and 30, respectively, but the retainer and sleeve are coupled with each other by means of the steel balls 26, and the front chip 20c of the shaft 20 is clamped into the retainer 27. A reference numeral 31 denotes a stop ring for preventing the movement of the sleeve 28.

As shown in FIGS. 3 and 4, prior to the coupling of the tool holder 14 to the main spindle 1 of the machine tool, the clamping nut 13 is locked by the locking means 16 at position which the clamping claws 13b and driving force transmitting keys 12 are corresponded to each other, and in this condition, the tool holder 14 is secured to the main spindle 1. That is to say, the tool holder 14 is inserted by the automatic tool changing (ATC) device, while the phase of the key recesses 14e of the tool holder 14 are matched with the phase of the driving force transmitting keys 12. Next, the main spindle 1 is rotated in a given direction at a relatively low speed, the clamping nut 13 is moved upward due to the screw function between the clamping nut 13 and the interconnecting member 11.

Therefore, the tool holder 14 is pushed upward by means of the clamping claws 13b of the clamping nut 13 and the contact end face 14c of the tool holder 14 is urged against the contact end face 11e of the interconnecting member 11 and the tool holder 14 is coupled with the main spindle 1. This coupling is very stable due to the engagement of the tapered opening 14b and the male tapered portion 11d. Then, ATC device and locking means 16 are removed from the operating positions and are returned into the standby positions.

Figure 7:
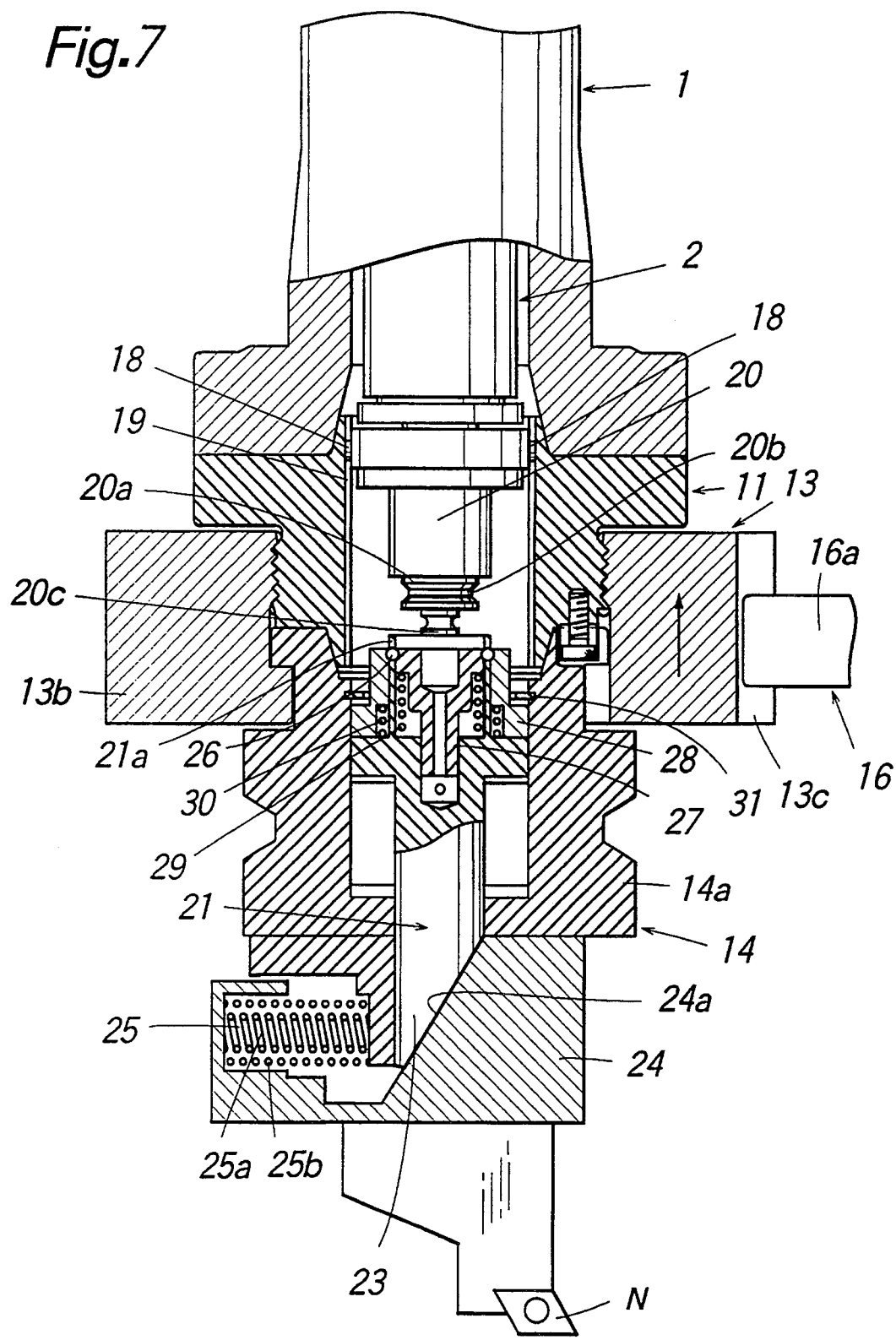
FIG. 7 is a longitudinal cross sectional view explaining the operation of coupling the tool holder with the main spindle.

The coupling operation of the driving shaft 2 with the piston member 21 will be explained with reference to FIG. 7 which shows a condition in which the tool holder 14 is secured to the interconnecting member 11 by means of the clamping nut 13. In this condition, when the driving shaft 2 is moved downward, the front chip 20c is inserted into the retainer 27 provided in the tool holder 14, and after that the driving shaft 2 is further moved downward such that the projection 20a is inserted into the cylindrical member 21a and the retainer is moved downward.

Figure 8:
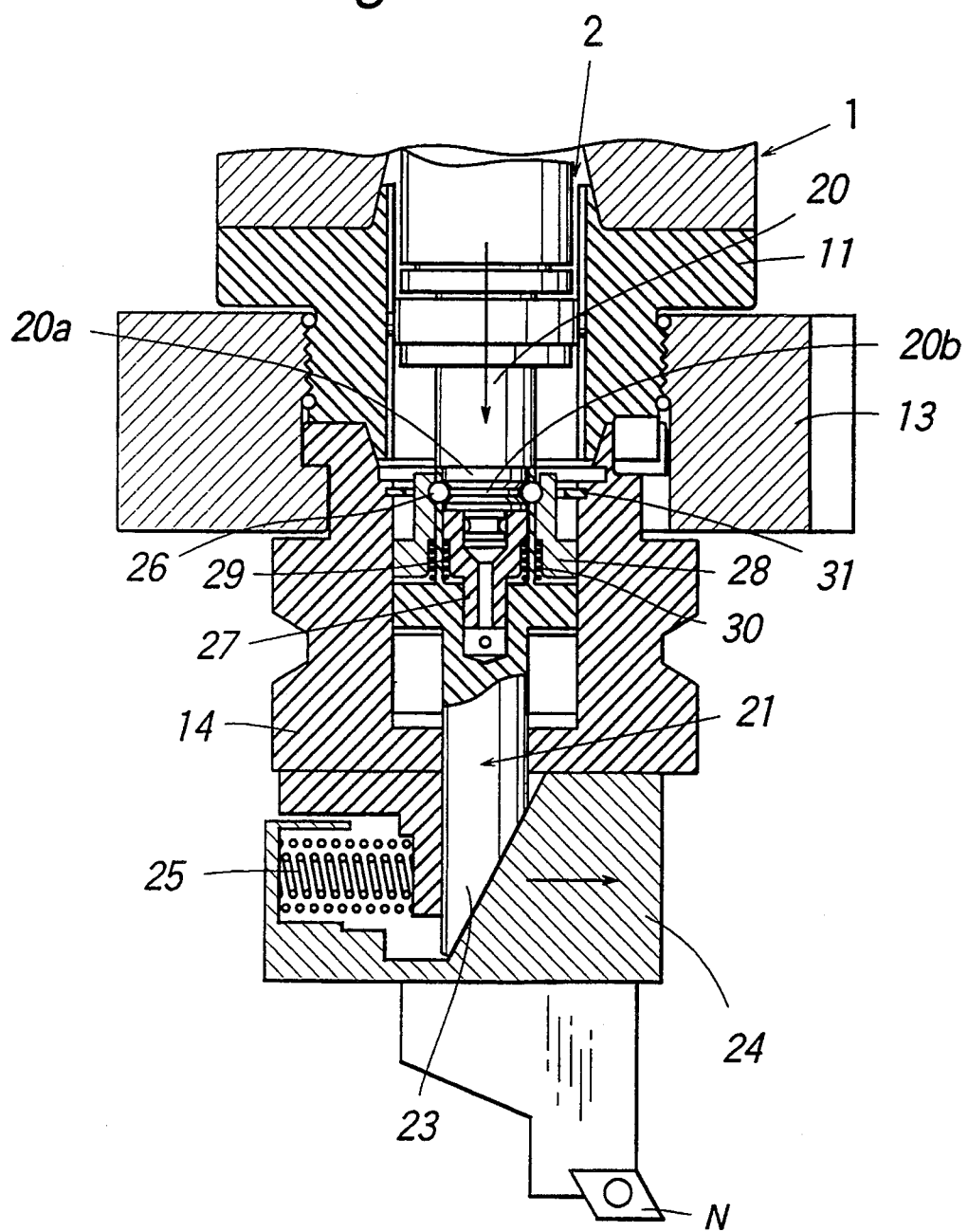
FIG. 8 is a cross sectional view explaining the operation of moving the tool in the radial direction.
Figure 9:
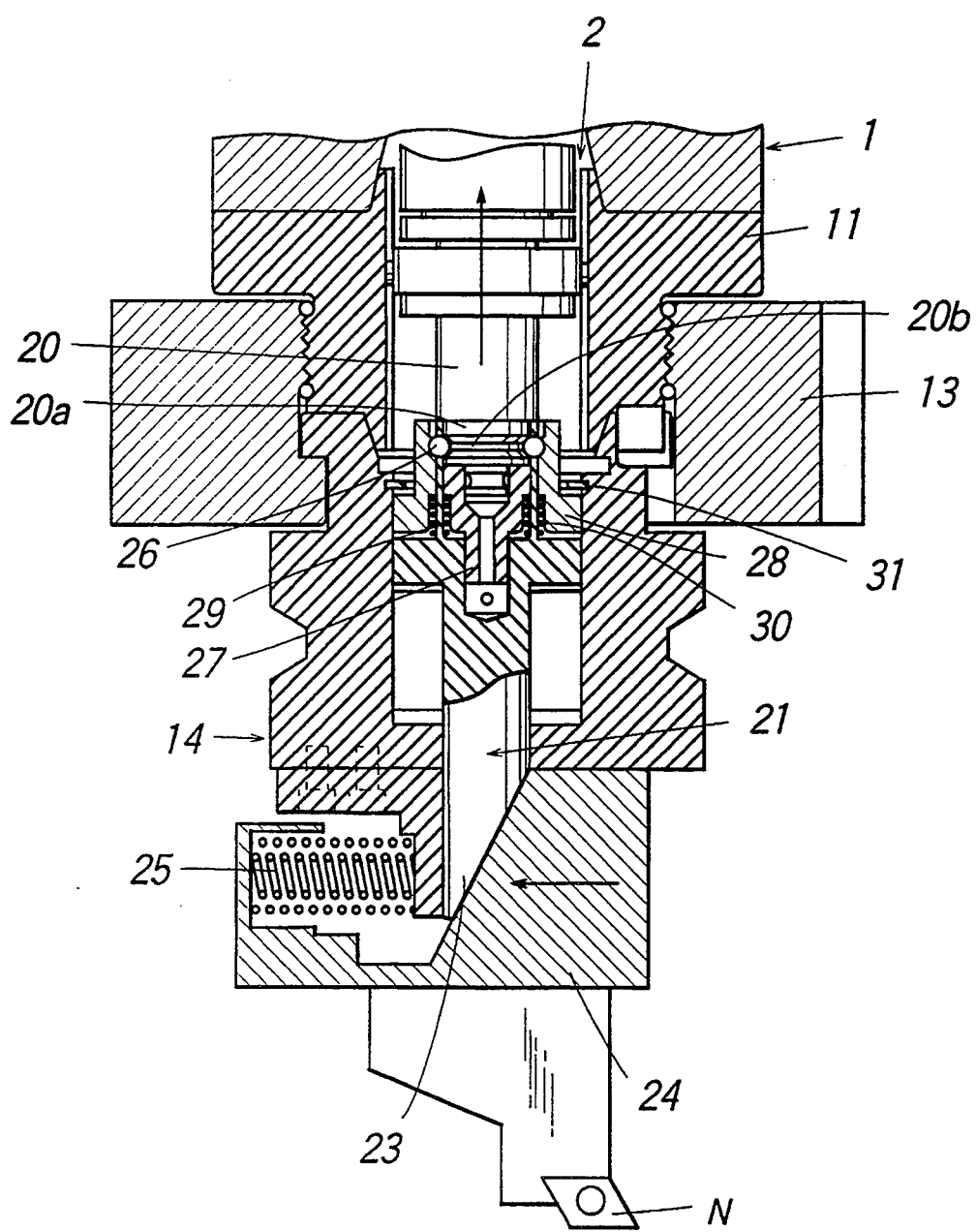
FIG. 9 is a cross sectional view explaining the operation of decoupling the tool holder from the main spindle.

When the shaft 20 is moved downward such that the circular recess 20b of the projection 20a is faced with the steel balls 26, the steel balls are pushed into the circular recess, because the steel balls are resiliently biased by the spring 30 by means of the sleeve 28. Then, the sleeve 28 is moved upward and is coupled with the projection 20a as depicted in FIG. 8. Then, after the driving shaft 2 has been slightly moved downward, the driving shaft is moved upward into the zero position as shown in FIG. 9. In this manner, the tool holder 14 can be secured to the driving shaft 2.

When the tool holder 14 is removed from the driving shaft 2, the driving shaft is moved upward so that the piston member 21 is also moved upward. However, the upward movement of the sleeve 28 is prevented by the stop ring 31. When the steel balls 26 are moved upward together with the retainer 27 into a such a position that the steel balls are faced with the circular recess formed in the inner surface of the sleeve 28, the steel balls are pushed outwardly from the circular recess 20b of the projection 20a by the force of the spring 30 into the circular recess formed in the inner wall of the sleeve 28. After that, when the driving shaft 2 is further moved upward, the retainer 27 is moved upward by means of the spring 29 into the position shown in FIG. 7. In this manner, the coupling of the tool holder 14 with the driving shaft 2 can be released.

When the tool holder 14 is changed by another tool holder, at first the rotation of the clamping nut 13 is locked by the locking means 16 and then the main spindle 1 is rotated at a low speed in the unlock direction, so that the phase of the key recesses 14e of the tool holder 14 is matched with the phase of the clamping claws 13b of the clamping nut 13. Then, the tool holder 14 can be removed from the driving shaft 2 by moving the tool holder downward, and then another tool holder can be detachably secured to the main spindle 1 by means of an arm of the automatic tool changing device. In this manner, according to the invention, the coupling and decoupling of the tool holder 14 with respect to the driving shaft 2 provided within the main spindle 1 can be performed easily and positively by utilizing the axial movement of the driving shaft.

In the embodiment so far explained, the zero point of the driving shaft 2 is set at a position which is higher than the coupling point, but according to the invention, the zero point may be set at a position below the coupling point. In such a case, it is necessary to move the driving shaft 2 after the coupling.

Figure 10:
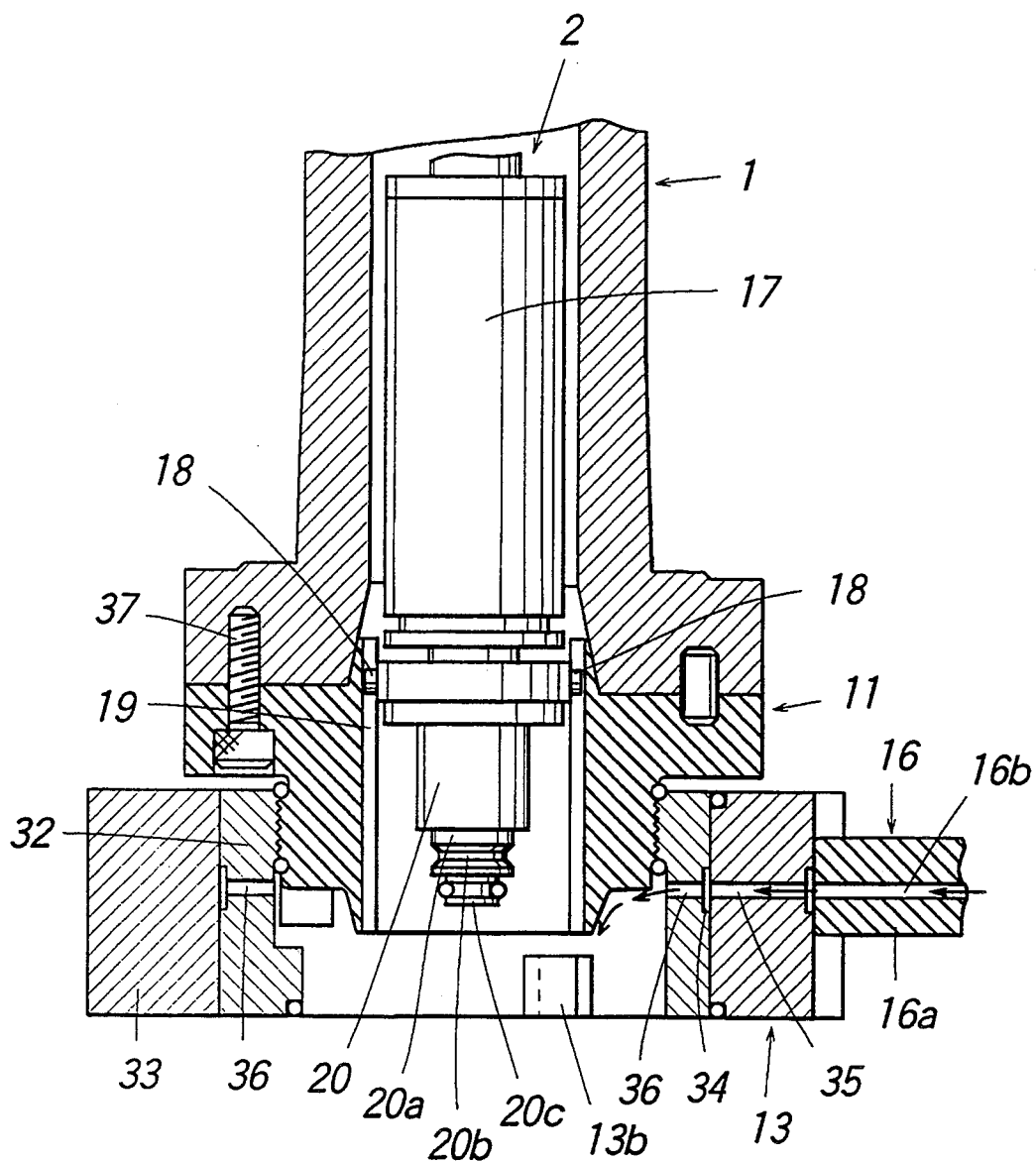
FIG. 10 is a cross sectional view illustrating another embodiment of the main spindle apparatus according to the invention.

FIG. 10 is a longitudinal cross sectional view showing another embodiment of the main spindle apparatus according to the invention. The contact surface of the interconnecting member 11 and the contact surface of the tool holder 14 have to be cleaned so that any dusts or cutting debrises are removed therefrom. In the present embodiment, an air blow mechanism is provided in the clamping nut 13. That is to say, when the tool holder 14 is changed by another tool holder, an air is introduced into the inside of the clamping nut 13 to eject an air stream onto the contact surfaces of the interconnecting member 11 and tool holder 14. To this end, the clamping nut 13 consists of inner part 32 and outer part 33, and a ring-like recess 34 is formed between the inner and outer parts. In the outer part 33 there is formed a conduit 35 which is communicated with the recess 34. In the inner part 32, there are formed a plurality of ejecting outlets 36 which are communicated with the ring-like recess 34. Further, in the rod 16a of the locking means 16 there is formed a conduit 16b which is communicated with an air supply device. When the locking rod 16a is urged against the clamping nut 13 as shown in FIG. 10, the conduit 16b is communicated with the conduit 35, so that the air is supplied via the conduits 16b and 35 and ring-shaped recess 34 to the ejecting outlets 36. In this manner, the contact surfaces of the clamping nut 13 and tool holder 14 are cleaned by the air streams ejected from the outlets 36. In the present embodiment, the air is used to clean the contact surfaces of the clamping nut 13 and tool holder 14, but any other fluid may be equally utilized.

The present invention is not limited to the embodiments explained above, but many modifications may be conceived by those skilled in the art within the scope of the invention. For instance, a conduit may be provided in the driving shaft 2 or piston member 21 and a cutting oil may be supplied through the conduit. Further, in the above embodiments, the coupling and decoupling of the tool holder 14 with and from the driving shaft 2 are performed only by the movement of the driving shaft in the axial direction, but according to the invention the driving shaft may be modified such that the coupling and decoupling are carried out by both the rotational and axial movements of the driving shaft like as a bayonet coupling.

In the embodiments explained above, the interconnecting member 11 is secured to the lower end of the main spindle 1 by means of bolts 37, but the interconnecting member and main spindle may be formed an integral body.

As explained above in detail, in the main spindle apparatus according to the invention, only the first driving member, i.e. the driving shaft is provided within the main spindle, so that it is no longer necessary to make the diameter of the main spindle large and its construction can be simplified. Therefore, the main spindle apparatus according to the invention is particularly suitable for the high speed rotation. Further, the coupling and decoupling of the first driving member and the second driving member, i.e. the piston member can be performed by merely moving the first driving member in the axial direction, and thus the control can be effected very easily and the control of the radial movement of the tool can be carried out very precisely without being affected by backlash.

What is claimed is:

1. A main spindle apparatus of a machine tool comprising:
   a main spindle having a male screw formed in an outer surface of one portion of the main spindle;
   a clamping nut having a female screw which is screwed with said male screw of the main spindle and a plurality of clamping claws for detachably securing a tool holder having a tool arranged movably in a radial direction perpendicular to an axial direction of the main spindle;
   a first driving member provided within said main spindle and having first and second end portions, said first end portion being connectable to a driving source;
   a second driving member provided within said tool holder such that the second driving member is detachably coupled with said second end portion of said first driving member; and
   a coupling means for coupling said second end portion of said first driving member with said second driving member when the tool holder is coupled with the main spindle; wherein when said first driving member is driven, said second member is driven such that the tool secured to the tool holder is moved in said radial direction perpendicular to the axial direction of the main spindle.

2. A main spindle apparatus according to claim 1, wherein said first driving member is formed by a driving shaft which is arranged coaxially within the main spindle and movable in the axial direction, but could not be rotated, said second driving member is formed by a piston member arranged within the tool holder movably in the axial direction, and said coupling means is constructed such that the piston member is detachably secured to the driving shaft by means of the coupling means.

3. A main spindle apparatus according to claim 2, wherein said coupling means comprises a circular recess formed on an outer surface of an end portion of the first driving member and a plurality of balls which are movably secured to the piston member and are selectively inserted into said circular recess.

4. A main spindle apparatus according to claim 2, wherein a tool fitting plate is arranged in the tool holder movably in the radial direction and the axial movement of the piston member is translated into the radial movement of the tool fitting plate.

5. A main spindle apparatus according to claim 4, wherein an end face of the piston member is inclined with respect to the axial direction and one end of the tool fitting plate is formed as an inclined cam surface which is resiliently urged against said inclined end face of the piston member.

6. A main spindle apparatus according to claim 3, wherein said clamping means comprises a cylindrical member formed at an end of said piston member, a retaining member arranged within the cylindrical member movably in the axial direction, and a sleeve arranged on the cylindrical member movably in the axial direction, a spring for biasing the retaining member toward the driving shaft, a spring for biasing the sleeve toward the driving shaft, and a stop ring secured to the tool holder for restricting the movement of the sleeve toward the driving shaft.

7. A main spindle apparatus according to claim 2, wherein said clamping nut has formed therein a conduit for connecting a fluid source and a plurality of ejecting outlets communicated with said conduit, wherein fluid is ejected from the ejecting outlets such that contact surfaces of the driving shaft and tool holder are cleaned by the fluid.

* * * * *